US011095957B2

(12) United States Patent
Tang

(10) Patent No.: US 11,095,957 B2
(45) Date of Patent: Aug. 17, 2021

(54) METHOD AND APPARATUS FOR PUBLISHING INFORMATION, AND METHOD AND APPARATUS FOR PROCESSING INFORMATION

(71) Applicant: Baidu Online Network Technology (Beijing) Co., Ltd., Beijing (CN)

(72) Inventor: Huan Tang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 62 days.

(21) Appl. No.: 16/355,184

(22) Filed: Mar. 15, 2019

(65) Prior Publication Data
US 2020/0007959 A1  Jan. 2, 2020

(30) Foreign Application Priority Data
Jun. 29, 2018  (CN) .......................... 201810718063.9

(51) Int. Cl.
*H04N 21/8545* (2011.01)
*H04N 21/234* (2011.01)
*H04N 21/2387* (2011.01)
*H04N 21/239* (2011.01)
*H04N 21/8352* (2011.01)

(52) U.S. Cl.
CPC ....... *H04N 21/8545* (2013.01); *H04N 21/234* (2013.01); *H04N 21/2387* (2013.01); *H04N 21/2393* (2013.01); *H04N 21/8352* (2013.01)

(58) Field of Classification Search
None
See application file for complete search history.

(56) References Cited

U.S. PATENT DOCUMENTS 7,178,161 B1 *  2/2007  Fristoe ............. H04L 29/06027
                                                 348/E7.073
2005/0044560 A1 *  2/2005  Kryeziu ............... H04N 21/812
                                                 725/14
(Continued)

FOREIGN PATENT DOCUMENTS

CN  103647817 A  3/2014
CN  104572996 A  4/2015
(Continued)

*Primary Examiner* — Alexander Q Huerta
(74) *Attorney, Agent, or Firm* — Knobbe, Martens, Olson & Bear, LLP

(57) ABSTRACT

Embodiments of a method and apparatus for publishing information and a method and apparatus for processing information are provided. An embodiment of the method for publishing information can comprise: receiving a request for publishing a video playing application, the request for publishing including configuration information of the video playing application; applying a preset video interactive template to the video playing application, the video interactive template including a processing logic relating to a video; and publishing, based on the configuration information, the video playing application applied with the video interactive template. According to some embodiments, by applying the preset video interactive template, a developer may complete the development and the publishing of the video playing application without paying attention to the processing logic of the video, thereby effectively reducing the development costs.

18 Claims, 4 Drawing Sheets

(56) References Cited

U.S. PATENT DOCUMENTS

| | | | | |
|---|---|---|---|---|
| 2006/0259588 A1* | 11/2006 | Lerman | ............ | H04N 21/6156 |
| | | | | 709/219 |
| 2007/0157252 A1* | 7/2007 | Perez | ............ | H04N 21/4786 |
| | | | | 725/61 |
| 2012/0042250 A1* | 2/2012 | Hartwig | ............ | G06F 16/70 |
| | | | | 715/719 |
| 2012/0236201 A1* | 9/2012 | Larsen | ............ | H04N 21/439 |
| | | | | 348/468 |
| 2013/0227415 A1* | 8/2013 | Gregg | ............ | G11B 27/031 |
| | | | | 715/723 |
| 2016/0170712 A1 | 6/2016 | Luan | | |
| 2016/0359957 A1* | 12/2016 | Laliberte | ............ | G06Q 30/0241 |
| 2017/0256288 A1* | 9/2017 | Ai | ............ | G11B 27/34 |
| 2018/0068019 A1* | 3/2018 | Novikoff | ............ | G06F 16/783 |
| 2018/0255173 A1* | 9/2018 | Yuan | ............ | H04M 3/42042 |

FOREIGN PATENT DOCUMENTS

| | | |
|---|---|---|
| CN | 108074150 A | 5/2018 |
| CN | 108174300 A | 6/2018 |
| JP | H11250052 A | 9/1999 |
| JP | 2001331307 A | 11/2001 |
| JP | 2017107307 A | 6/2017 |

* cited by examiner

METHOD AND APPARATUS FOR PUBLISHING INFORMATION, AND METHOD AND APPARATUS FOR PROCESSING INFORMATION

CROSS-REFERENCE TO RELATED APPLICATIONS

This disclosure claims priority to Chinese Patent Application no. 201810718063.9, filed with the China National Intellectual Property Administration (CNIPA) on Jun. 29, 2018, the contents of which are incorporated herein by reference in their entirety.

TECHNICAL FIELD

Embodiments of the present disclosure relate to the field of computer technology, and specifically to a method and apparatus for publishing information and a method and apparatus for processing information.

BACKGROUND

At present, a developer usually needs to configure and develop separate intentions when developing a video playing application. The intention generally refers to the purpose of the speech of a user (i.e., what the user wants to express and what the user wants to do). If the user says "I want to watch the television drama ," the intent may refer to "playing the television drama ." When many video resources are processed, the development usually cost the developers highly, and many repeated logics exist.

SUMMARY

Embodiments of the present disclosure propose a method and apparatus for publishing information and a method and apparatus for processing information.

In a first aspect, the embodiments of the present disclosure provide a method for publishing information. The method includes: receiving a request for publishing a video playing application, the request for publishing including configuration information of the video playing application; applying a preset video interactive template to the video playing application, the video interactive template including a processing logic relating to a video; and publishing, based on the configuration information, the video playing application applied with the video interactive template.

In some embodiments, the processing logic includes a first processing logic. The first processing logic includes a logic for processing a request for playing a video and at least one request for: pausing playing, continuing playing, playing a previous video, playing a next video, stopping playing, adjusting a play progress, adjusting a volume, or adjusting a brightness.

In some embodiments, the processing logic further includes a second processing logic. The second processing logic includes a logic for processing at least one index request for: indexing a specified video, indexing hot videos, or indexing new videos.

In some embodiments, the configuration information includes application information and video resource information. The application information includes an application name, an application identifier, and at least one of: an application type name, a version number, a cover image, developer information, functional description information, or usage instructions. The video resource information includes address information of a video resource and at least one of an update frequency, an update time, or a resource type name.

In some embodiments, the publishing, based on the configuration information, the video playing application applied with the video interactive template includes: publishing the video playing application applied with the video interactive template to a preset server, to cause the server to push the video playing application to a client connected to the server, thereby displaying the application information of the video playing application on the client.

In some embodiments, the method further includes: storing correspondingly the video resource information and the application identifier.

In a second aspect, the embodiments of the present disclosure provide a method for processing information. The method includes: receiving a request related to a video resource provided by a target video playing application, the target video playing application referring to the video playing application published using the method described in any embodiment in the first aspect, the video playing application being applied with a preset video interactive template, and the video interactive template including a processing logic relating to a video; and processing the request using the video interactive template.

In a third aspect, the embodiments of the present disclosure provide an apparatus for publishing information. The apparatus includes: a receiving unit, configured to receive a request for publishing a video playing application, the request for publishing including configuration information of the video playing application; a setting unit, configured to apply a preset video interactive template to the video playing application, the video interactive template including a processing logic relating to a video; and a publishing unit, configured to publish, based on the configuration information, the video playing application applied with the video interactive template.

In some embodiments, the processing logic includes a first processing logic. The first processing logic includes a logic for processing a request for playing a video and at least one request for: pausing playing, continuing playing, playing a previous video, playing a next video, stopping playing, adjusting a play progress, adjusting a volume, or adjusting a brightness.

In some embodiments, the processing logic further includes a second processing logic. The second processing logic includes a logic for processing at least one index request for: indexing a specified video, indexing hot videos, or indexing new videos.

In some embodiments, the configuration information includes application information and video resource information. The application information includes an application name, an application identifier, and at least one of: an application type name, a version number, a cover image, developer information, functional description information, or usage instructions. The video resource information includes address information of a video resource and at least one of an update frequency, an update time, or a resource type name.

In some embodiments, the publishing unit is further configured to: publish the video playing application applied with the video interactive template to a preset server, to cause the server to push the video playing application to a client connected to the server, thereby displaying the application information of the video playing application on the client.

In some embodiments, the apparatus further includes: a storing unit, configured to store correspondingly the video resource information and the application identifier.

In a fourth aspect, the embodiments of the present disclosure provide an apparatus for processing information. The apparatus includes: a receiving unit, configured to receive a request related to a video resource provided by a target video playing application, the target video playing application referring to the video playing application published using the method described in any embodiment in the first aspect, the video playing application being applied with a preset video interactive template, and the video interactive template including a processing logic relating to a video; and a processing unit, configured to process the request using the video interactive template.

In a fifth aspect, the embodiments of the present disclosure provide an electronic device. The electronic device includes: one or more processors; and a storage device, configured to store one or more programs. The one or more programs, when executed by the one or more processors, cause the one or more processors to implement the method described in any embodiment in the first aspect or in the second aspect.

In a sixth aspect, the embodiments of the present disclosure provide a computer readable medium storing a computer program. The program, when executed by a processor, implements the method described in any embodiment in the first aspect or in the second aspect.

According to the method and apparatus for publishing information provided by the embodiments of the present disclosure, the request for publishing the video playing application is received. Next, the preset video interactive template is applied to the video playing application. Then, based on the configuration information of the video playing application, the video playing application applied with the video interactive template is published. Thus, the preset video interactive template is effectively utilized, so that the developer may complete the development and the publishing of the video playing application without paying attention to the processing logic of the video, thereby effectively reducing the development costs.

According to the method and apparatus for processing information provided by the embodiments of the present disclosure, in response to receiving the request relating to the video resource provided by the target video playing application (the video playing application published using the method described in any embodiment in the first aspect), the request is processed using the video interactive template that is applied to the target video playing application. Thus, the preset video interactive template is effectively utilized, thereby implementing the standard processing on the request relating to the video resource provided by the target video playing application.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be described below in detail with reference to the accompanying drawings and in combination with the embodiments. It should be appreciated that the specific embodiments described herein are merely used for explaining the disclosure, rather than limiting the disclosure. In addition, it should be noted that, for the ease of description, only the parts related to the relevant embodiment are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
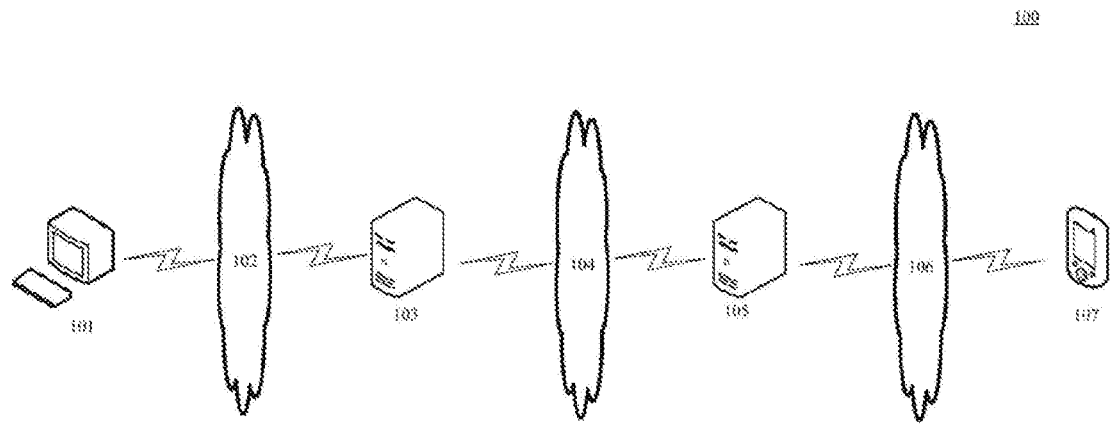
FIG. 1 is a diagram of an illustrative system architecture in which an embodiment of the present disclosure may be applied.

FIG. 1 shows an illustrative system architecture 100 in which an embodiment of a method for publishing information, an apparatus for publishing information, a method for processing information or an apparatus for processing information according to the present disclosure may be applied.

As shown in FIG. 1, the system architecture 100 may include terminal devices 101 and 107, servers 103 and 105, and networks 102, 104, and 106. The network 102 serves as a medium providing a communication link between the terminal device 101 and the server 103. The network 104 serves as a medium providing a communication link between the server 103 and the server 105. The network 106 serves as a medium providing a communication link between the server 105 and the terminal device 107. The networks 102, 104 and 106 may include various types of connections, for example, wired or wireless communication links, or optical fiber cables.

A developer may interact with the server 103 via the network 102 using the terminal device 101 to receive or transmit messages. Various communication client applications (e.g., a web browser application or a software publishing application) may be installed on the terminal device 101. In addition, the terminal device 101 may be hardware or software. When being the hardware, the terminal device 101 may be various electronic devices, which include, but not limited to, a smart phone, a tablet computer, and a laptop portable computer. When being the software, the terminal device 101 may be installed on the above listed electronic devices. The terminal device may be implemented as a plurality of pieces of software or a plurality of software modules (e.g., software or software modules for providing a distributed service), or as a single piece of software or a single software module, which will not be specifically defined here.

The server 103 may be a server providing various services, for example, a backend server providing a support for the software publishing application on the terminal device 101. The backend server may perform a process such as an analysis on a received request for publishing software (e.g., a video playing application). For example, the software indicated by the request for publishing is published to the server 105.

A user may interact with the server 105 via the network 106 using the terminal device 107 to receive or transmit messages. Various communication client applications (e.g., a web browser application or a video playing application) may be installed on the terminal device 107. In addition, the terminal device 107 may be hardware or software. When being the hardware, the terminal device 107 may be various electronic devices, which include, but not limited to, a smart phone, a tablet computer, a MP3 (Moving Picture Experts Group Audio Layer III) player, a MP4 (Moving Picture Experts Group Audio Layer IV) player, a smart television, and a laptop portable computer. When being the software, the terminal device 107 may be installed on the above listed electronic devices. The terminal device may be implemented as a plurality of pieces of software or a plurality of software modules (e.g., software or software modules for providing a distributed service), or as a single piece of software or a single software module, which will not be specifically defined here.

The server 105 may be a server providing various services, for example, a backend server providing a support for the video playing application on the terminal device 107. The backend server may perform a process such as an analysis on a received request related to a video (e.g., a request for playing a video or a request for indexing videos), and return the processing result (e.g., a video playing instruction or a result of indexing videos) to the terminal device 107.

It should be noted that the terminal device 101 and the terminal device 107 may be the same device or different devices. The server 103 and the server 105 may be the same server or different servers. In this regard, this embodiment does not impose any restriction.

It should be noted that the method for publishing information provided by the embodiments of the present disclosure is generally performed by the server 103. Correspondingly, the apparatus for publishing information is generally provided in the server 103. The method for processing information provided by the embodiments of the present disclosure is generally performed by the server 105. Correspondingly, the apparatus for processing information is generally provided in the server 105.

It should be noted that the server may be hardware or software. When being the hardware, the server may be implemented as a distributed server cluster composed of a plurality of servers, or as a single server. When being the software, the server may be implemented as a plurality of pieces of software or a plurality of software modules (e.g., software or software modules for providing a distributed service), or as a single piece of software or a single software module, which will not be specifically defined here.

It should be appreciated that the numbers of the terminal devices, the networks, and the servers in FIG. 1 are merely illustrative. Any number of terminal devices, networks, and servers may be provided based on actual requirements.

Figure 2:
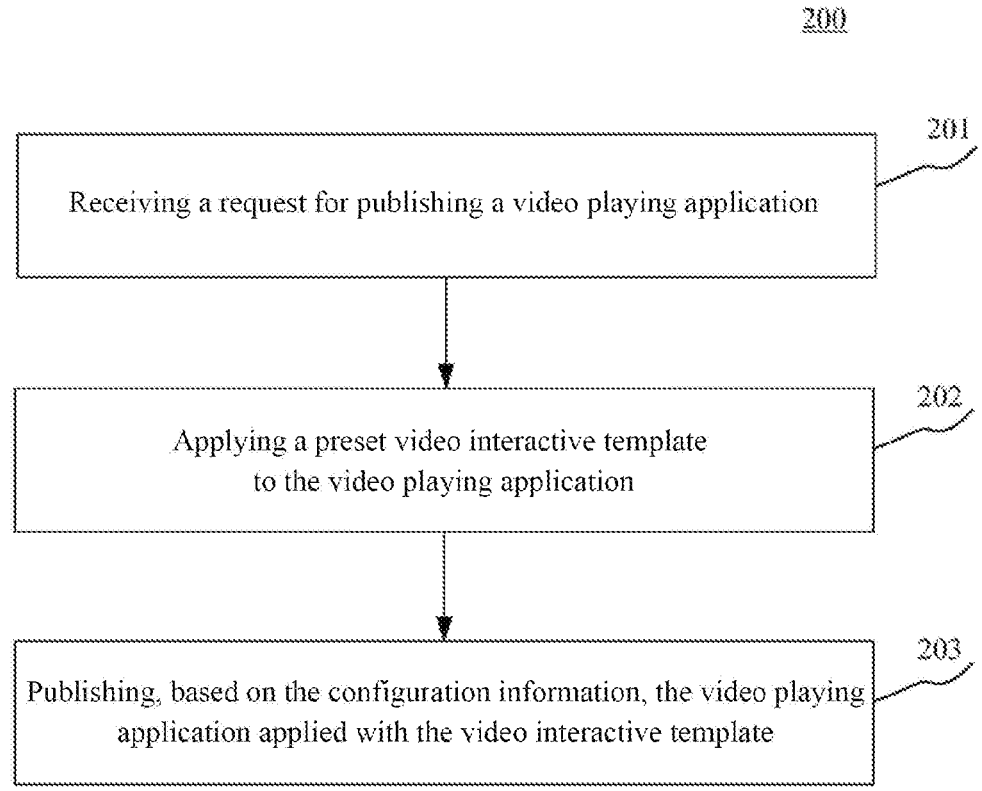
FIG. 2 is a flowchart of an embodiment of a method for publishing information according to the present disclosure.

Further referring to FIG. 2, a flow 200 of an embodiment of a method for publishing information according to the present disclosure is illustrated. The flow 200 of the method for publishing information includes the following steps.

Step 201, receiving a request for publishing a video playing application.

In this embodiment, an executor (e.g., the server 103 shown in FIG. 1) of the method for publishing information may receive the request for publishing the video playing application that is sent by a developer through a terminal device (e.g., the terminal device 101 shown in FIG. 1). The request for publishing may include configuration information of the video playing application. The configuration information may be information required when the video playing application is published, and the information may include, for example, application information and video resource information of the video playing application. The application information may include, for example, an application name and an application identifier. The application identifier may be used to uniquely identify the video playing application. In addition, the video resource information may include address information, a video identifier, etc. of a video resource provided by the video playing application. The address information may be, for example, a storage path of the video resource, or may be a URL (Uniform Resource Locator) of the video resource.

It should be noted that the executor may provide an interface for publishing the video playing application for the terminal device. The developer may input corresponding configuration information through the interface, and then send the request for publishing the video playing application to the executor by performing a preset publishing operation. As an example, the interface may display different field names (e.g., the application name and a resource address) and text boxes corresponding to the field names. The developer may input the corresponding configuration information in the text boxes under the guidance of the field names. In addition, the interface may further display a publishing option, and the preset publishing operation may be a selection operation on the publishing option. Therefore, after inputting the configuration information, the developer may send the request for publishing to the executor by selecting the publishing option.

In some alternative implementations of this embodiment, the executor may provide an interface for creating the video playing application for the terminal device. The executor may input basic application information (e.g., the application name) on the interface, and then perform a preset creating operation to create the video playing application. For example, the interface may display a determination option, and the creating operation may be a selection operation on the determination option. The developer may complete the creation for the video playing application by selecting the determining option. In addition, after detecting the creating operation on the video playing application, the executor may allocate a unique application identifier to the video playing application, and provide the terminal device with a publishing interface displaying information of the video playing application created by the developer. The developer may input other configuration information through the interface, and then perform the preset publishing operation to send the request for publishing the created video playing application to the executor.

In some alternative implementations of this embodiment, the application information not only includes the application name and the application identifier, but may also include an application type name, a version number, a cover image, developer information, functional description information, usage instructions, or an invocation name.

The application type to which the video playing application belongs may be, for example, video playing. Thus, the application type name may be, for example, "video playing."

For example, a format of the version number may be "number. number" (e.g., 1.0). When the video playing application is updated, the version number of the new version should be greater than the version number of the online version.

The cover image may be an image having a size that does not exceed a preset size (e.g., 100 KB (Kilobyte)) and a format that is a preset graphic format. The image may be used as a display icon of the published video playing application. For example, the preset graphic format may include, but not limited to, PNG (Portable Network Graphics), JPEG (Joint Photographic Experts Group), and the like. It should be noted that the preset size and the preset graphic format may be set according to actual needs. In this regard, this embodiment does not impose any restriction.

For example, the developer information may include a personal name or an enterprise name of the developer.

For example, the functional description information may include information for describing a basic function, a usage scenario, etc. of the video playing application.

The usage instructions may be information for describing how to use the video playing application.

The invocation name may be a wake-up word used to wake up the video playing application. The invocation name may also be used to uniquely identify a video playing application. In practice, for the published video playing application, the user, for example, may wake up the video playing application in the format "open+the invocation name of the video playing application." For example, the name of the video playing application is " video," and the user may input "open the  video" in a form of voice or text using the terminal device that the video playing application has been installed on, to wake up the video playing application.

In some alternative implementations of this embodiment, the video resource information may further include an update frequency, an update time, a resource type name, etc. The update frequency may be daily, weekly or monthly. The update time may be, for example, 8:00 p.m., 10:00 p.m., or 0:00 p.m. The resource type of the video resource may be video, or a subclass of the video (e.g., television drama, movie, variety show, and animation).

Step 202, applying a preset video interactive template to the video playing application.

In this embodiment, after receiving the request for publishing the video playing application, the executor may apply the preset video interactive template to the video playing application. The video interactive template may include a processing logic related to the video, for example, a processing logic for processing a request for playing a video. As an example, the executor may acquire a locally pre-stored video interactive template, then, write specified information (e.g., the application identifier, and the resource address) in the configuration information of the video playing application to a corresponding position in the video interactive template, and finally use the current video interactive template as a code file of the video playing application.

In some alternative implementations of this embodiment, the processing logic may include a first processing logic. The first processing logic may include a logic for processing the request for playing a video and at least one request for: pausing playing, continuing playing, playing a previous video, playing a next video, stopping playing, adjusting a play progress, adjusting a volume, or adjusting a brightness. The request for playing a video may be a request for playing a specified video. The pausing playing may refer to the pausing of the play of the video that is playing now. The continuing playing may refer to the resuming of the play of the paused video. The playing a previous video may refer to the play of the previous video of the video that is playing now. The playing a next video may refer to the play of the next video of the video that is playing now. The stopping playing may refer to the stopping of the play of the video that is playing now.

In some alternative implementations of this embodiment, the processing logic may include a second processing logic in addition to the first processing logic. The second processing logic may include a logic for processing at least one index request for: indexing a specified video, indexing hot videos, or indexing new videos. The indexing a specified video may refer to the index of the specified video. The indexing hot videos may refer to the index of a video having a high heat level. For example, the heat level of the video may be determined based on the number of plays of the video. The indexing new videos may refer to the index of a video updated in a recent period of time (e.g., nearly half a month, one month, or three months).

Step 203, publishing, based on the configuration information, the video playing application applied with the video interactive template.

In this embodiment, after applying the preset video interactive template to the video playing application, the executor may publish, based on the configuration information of the video playing application, the video playing application applied with the video interactive template. As an example, the configuration information may include a server address provided by the developer, and the executor may publish the video playing application to the server indicated by the server address.

In some alternative implementations of this embodiment, the executor may publish the video playing application applied with the video interactive template to a preset server (e.g., the server 105 shown in FIG. 1), to cause the server to push the video playing application to a client (e.g., the terminal device 107 shown in FIG. 1) connected to the server, thereby displaying the application information (e.g., the application information other than the application identifier) of the video playing application on the client. It should be noted that the server may be a server providing a support for a service providing application, and the client may be a client provided with the service providing application. The service providing application may be integrated with different types of sub-applications. The user may enable the required sub-applications in the service providing application to be used according to actual needs. Therefore, in practice, the server may use the video playing application applied with the video interactive template as the sub-application to push the video playing application to the client, thereby displaying the application information of the video playing application on an interface of the service providing application on the client.

In some alternative implementations of this embodiment, the executor may further correspondingly store the video resource information and the application identifier. For example, the video resource information and the application identifier are stored according to a preset data structure. The data structure is an approach for a computer to store and organize data. For example, the data structure may include a tree structure, an array, etc. The preset data structure may be set according to actual needs. In this regard, this embodiment does not impose any restriction.

Figure 3:
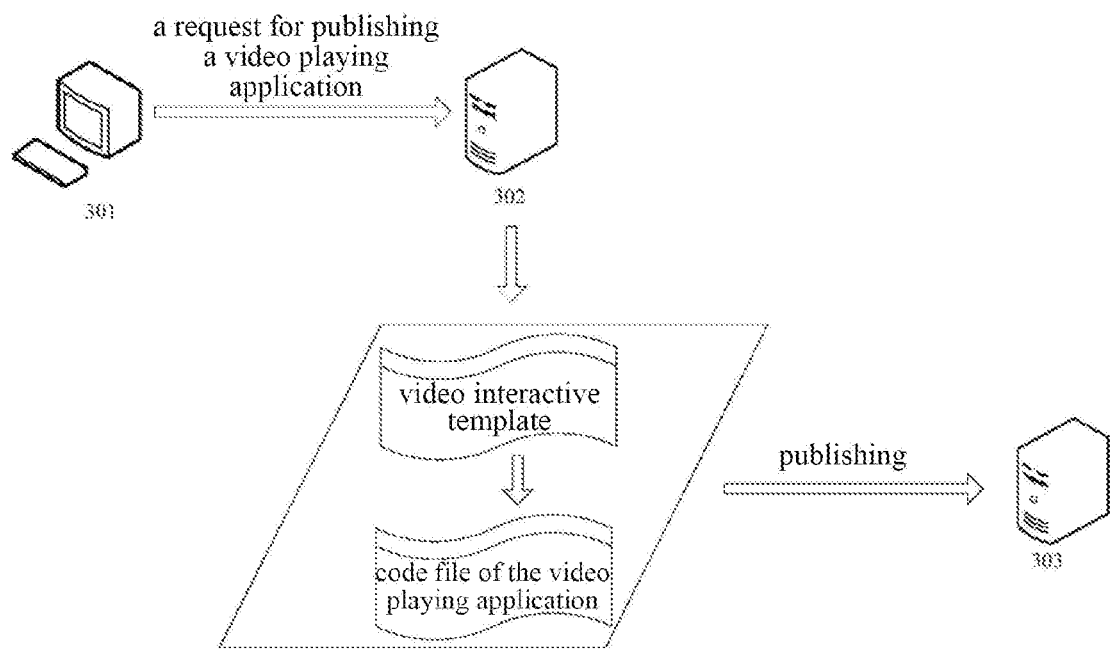
FIG. 3 is a schematic diagram of an application scenario of the method for publishing information according to an embodiment of the present disclosure.

Further referring to FIG. 3, FIG. 3 is a schematic diagram of an application scenario of the method for publishing information according to this embodiment. In the application scenario of FIG. 3, the developer may open the interface for publishing the video playing application, which is provided by the server 302, through the terminal device 301, and then input the configuration information of a video playing application desired to be published under the guidance of the information (e.g., the field name) displayed on the interface. The configuration information may include the application information, the video resource information, and the server address. The developer may then perform the preset publishing operation on the interface to send the request for publishing the video playing application to the server 302. The server 302 may acquire the locally pre-stored video interactive template in response to receiving the request for publishing, write the specified information in the configuration information to the corresponding position in the video interactive template, and then use the current video interactive template as the code file of the video playing application. Finally, the server 302 may publish the video playing application applied with the video interactive template to the server 303 indicated by the server address.

In the method provided by the above embodiment of the present disclosure, the request for publishing the video playing application is received. Next, the preset video interactive template is applied to the video playing application. Then, based on the configuration information of the video playing application, the video playing application applied with the video interactive template is published. Thus, the preset video interactive template is effectively utilized, so that the developer may complete the development and the publishing of the video playing application without paying attention to the processing logic of the video, thereby effectively reducing the development costs.

Figure 4:
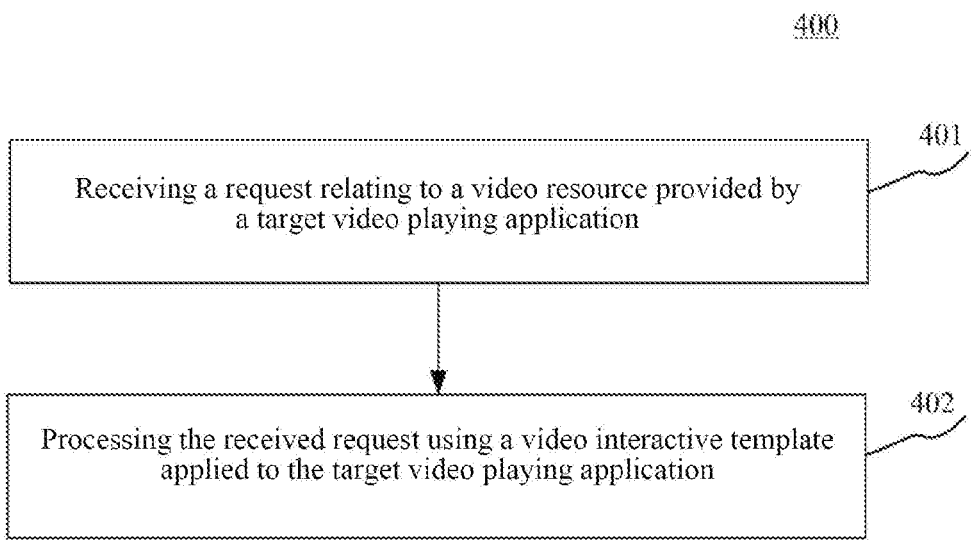
FIG. 4 is a flowchart of an embodiment of a method for processing information according to the present disclosure.

Further referring to FIG. 4, a flow 400 of an embodiment of a method for processing information is illustrated. The flow 400 of the method for processing information includes the following steps.

Step 401, receiving a request related to a video resource provided by a target video playing application.

In this embodiment, an executor (e.g., the server 105 shown in FIG. 1) of the method for processing information may receive the request relating to the video resource provided by the target video playing application by means of a wired connection or a wireless connection, the request being sent by a user through a terminal device (e.g., the terminal device 107 shown in FIG. 1).

The target video playing application may refer to the video playing application published using the method provided in the embodiment shown in FIG. 2, the video playing application being applied with a preset video interactive template. The video interactive template may include a processing logic relating to a video. The processing logic may include a first processing logic. For example, the first processing logic may include a logic for processing a request for playing a video and at least one request for: pausing playing, continuing playing, playing a previous video, playing a next video, stopping playing, adjusting a play progress, adjusting a volume, or adjusting a brightness. In addition, the processing logic may further include a second processing logic. For example, the second processing logic may include a logic for processing at least one index request for: indexing a specified video, indexing hot videos, or indexing new videos.

In addition, the request related to the video received by the executor may be, for example, playing the video, pausing playing, continuing playing, playing a previous video, playing a next video, stopping playing, adjusting a play progress, adjusting a volume, adjusting a brightness, indexing a specified video, indexing hot videos, or indexing new videos.

It should be noted that the terminal device may be a device using the AI (Artificial Intelligence) technology, for example, a device equipped with a conversational artificial intelligence operating system (e.g., DuerOS). Here, AI is a new technical science that studies and develops theories, methods, techniques and application systems for simulating, extending and expanding human intelligence. AI is a branch of computer science that attempts to understand the essence of intelligence and produce a new intelligent machine that responds in a manner similar to human intelligence. Research in this area includes robotics, speech recognition, image recognition, and natural language processing and expert systems.

After enabling the target video playing application on the terminal device, the user may send an instruction, for example, a video playing instruction, to the terminal device by voice or text. After receiving the instruction sent by the user, the terminal device may analyze the instruction to determine the intent of the user. For example, when the user inputs "I want to watch the television drama " by voice, the terminal device may obtain the intent of the user "playing the television drama " after performing speech recognition on the voice information "I want to watch the television drama **." Then, the terminal device may send the request carrying the intent information of the user to the executor. The intent information, for example, may be information in a preset format. The preset format, for example, may be a JSON format.

Step 402, processing the received request using the video interactive template applied to the target video playing application.

In this embodiment, after receiving the request relating to the video resource provided by the target video playing application, the executor may process the request using the video interactive template that is applied to the target video playing application.

For example, if the request received by the executor is a request to control the video, for example, a request for playing a video, a request for pausing playing, or a request for stopping playing, the executor may perform a process such as an analysis on the received request using the first processing logic included in the video interactive template, and return a corresponding control instruction (e.g., a video playing instruction or a play pausing instruction) to the terminal device. It should be noted that the control instruction may be an instruction carrying the information in the preset format (e.g., JSON format). After receiving the control instruction, the terminal device may control the video correspondingly based on the control instruction.

Here, taking the playing the video as an example, in response to the request received by the executor being the request for playing a video, the executor may process the received request using the logic for processing the request for playing a video in the first processing logic. The logic, for example, may include: detecting, for the video resource indicated by the received request, a time point for playing of the video resource associated with the sender of the request, and sending a video playing instruction to the sender, the video playing instruction indicating that the video resource is played at the time point for playing. The time point for playing may be referred to as a time position for playing. For example, when the total length of the time axis of a video resource is 40 minutes (expressed as 40:00) and the time point the user last stopped watching the video is the 12$^{th}$ minute, the time point for playing of the video resource may refer to 12:00.

As another example, if the request received by the executor is an index request, the executor may process the received request using the second processing logic included in the video interactive template.

Here, taking the indexing hot videos as an example, in response to the request received by the executor being a request for indexing hot videos, the executor may process the received request using the logic for processing the request for indexing hot videos in the second processing logic. The logic, for example, may include: acquiring the number of plays of the video resources provided by the target video playing application, using a preset number (e.g., 1, 3, or 10) of video resources in descending order of the number of plays as hot videos, and returning the information of the hot videos to the sender of the request. It should be noted that the executor may calculate the number of the plays of the video resources provided by the target video playing application in real time.

Taking the request for indexing new videos as an example, in response to the request received by the executor being a request for indexing new videos, the executor may process the received request using the logic for processing the request for indexing new videos in the second processing logic. The logic, for example, may include: acquiring an update time of the video resources provided by the target video playing application, using the video resources having the update time that is within a preset time period (e.g., nearly half a month, one month, or three months) as the new videos, and returning the information of the new videos to the sender of the request.

According to the method provided by the above embodiment of the present disclosure, in response to receiving the request relating to the video resource provided by the target video playing application, the request is processed using the video interactive template that is applied to the target video playing application. Thus, the preset video interactive template is effectively utilized, thereby implementing the standard processing on the request relating to the video resource provided by the target video playing application.

Figure 5:
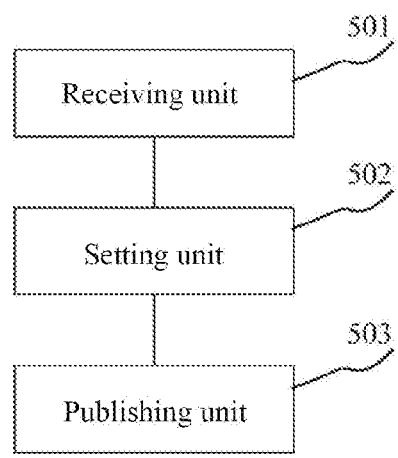
FIG. 5 is a schematic structural diagram of an embodiment of an apparatus for publishing information according to the present disclosure.

Further referring to FIG. 5, as an implementation of the method shown in the above drawings, the present disclosure provides an embodiment of an apparatus for publishing information. The embodiment of the apparatus corresponds to the embodiment of the method shown in FIG. 2, and the apparatus may be applied in various electronic devices.

As shown in FIG. 5, the apparatus 500 for publishing information in this embodiment includes: a receiving unit 501, configured to receive a request for publishing a video playing application, the request for publishing including configuration information of the video playing application; a setting unit 502, configured to apply a preset video interactive template to the video playing application, the video interactive template including a processing logic relating to a video; and a publishing unit 503, configured to publish, based on the configuration information, the video playing application applied with the video interactive template.

In this embodiment, for specific processes of the receiving unit 501, the setting unit 502 and the publishing unit 503 in the apparatus 500 for publishing information, and their technical effects, reference may be made to relative descriptions of step 201, step 202 and step 203 in the corresponding embodiment of FIG. 2 respectively, which will not be repeatedly described here.

In some alternative implementations of this embodiment, the processing logic may include a first processing logic. The first processing logic may include a logic for processing a request for playing a video and at least one request for: pausing playing, continuing playing, playing a previous video, playing a next video, stopping playing, adjusting a play progress, adjusting a volume, or adjusting a brightness.

In some alternative implementations of this embodiment, the processing logic may further include a second processing logic. The second processing logic may include a logic for processing at least one index request for: indexing a specified video, indexing hot videos, or indexing new videos.

In some alternative implementations of this embodiment, the configuration information may include application information and video resource information. The application information may include an application name, an application identifier, and at least one of: an application type name, a version number, a cover image, developer information, functional description information, or usage instructions. The video resource information may include address information of a video resource and at least one of an update frequency, an update time, or a resource type name.

In some alternative implementations of this embodiment, the publishing unit 503 may further be configured to: publish the video playing application applied with the video interactive template to a preset server, to cause the server to push the video playing application to a client connected to the server, thereby displaying the application information of the video playing application on the client.

In some alternative implementations of this embodiment, the apparatus 500 may further include: a storing unit (not shown), configured to store correspondingly the video resource information and the application identifier.

According to the apparatus provided by the embodiment of the present disclosure, the request for publishing the video playing application is received. Next, the preset video interactive template is applied to the video playing application. Then, based on the configuration information of the video playing application, the video playing application applied with the video interactive template is published. Thus, the preset video interactive template is effectively utilized, so that the developer may complete the development and the publishing of the video playing application without paying attention to the processing logic of the video, thereby effectively reducing the development costs.

Figure 6:
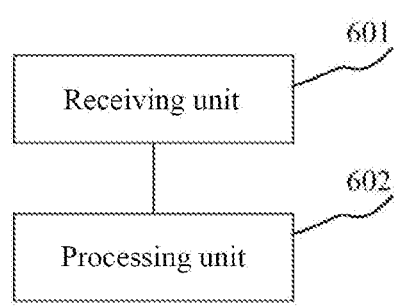
FIG. 6 is a schematic structural diagram of an embodiment of an apparatus for processing information according to the present disclosure.

Further referring to FIG. 6, as an implementation of the method shown in the above drawings, the present disclosure provides an embodiment of an apparatus for processing information. The embodiment of the apparatus corresponds to the embodiment of the method shown in FIG. 4, and the apparatus may be applied in various electronic devices.

As shown in FIG. 6, the apparatus 600 for processing information in this embodiment includes: a receiving unit 601, configured to receive a request related to a video resource provided by a target video playing application. The target video playing application may be the video playing application published using the method provided in the embodiment shown in FIG. 2, the video playing application applies a preset video interactive template, and the video interactive template may include a processing logic relating to a video. The apparatus further includes: a processing unit 602, configured to process the request using the video interactive template.

In this embodiment, for specific processes of the receiving unit 601 and the processing unit 602 in the apparatus 600 for processing information, and their technical effects, reference may be made to relative descriptions of step 401, and step 402 in the corresponding embodiment of FIG. 4 respectively, which will not be repeatedly described here.

According to the apparatus provided by the embodiment of the present disclosure, in response to receiving the request relating to the video resource provided by the target video playing application, the request is processed using the video interactive template applied to the target video playing application. Thus, the preset video interactive template is effectively utilized, thereby implementing the standard processing on the request relating to the video resource provided by the target video playing application.

Figure 7:
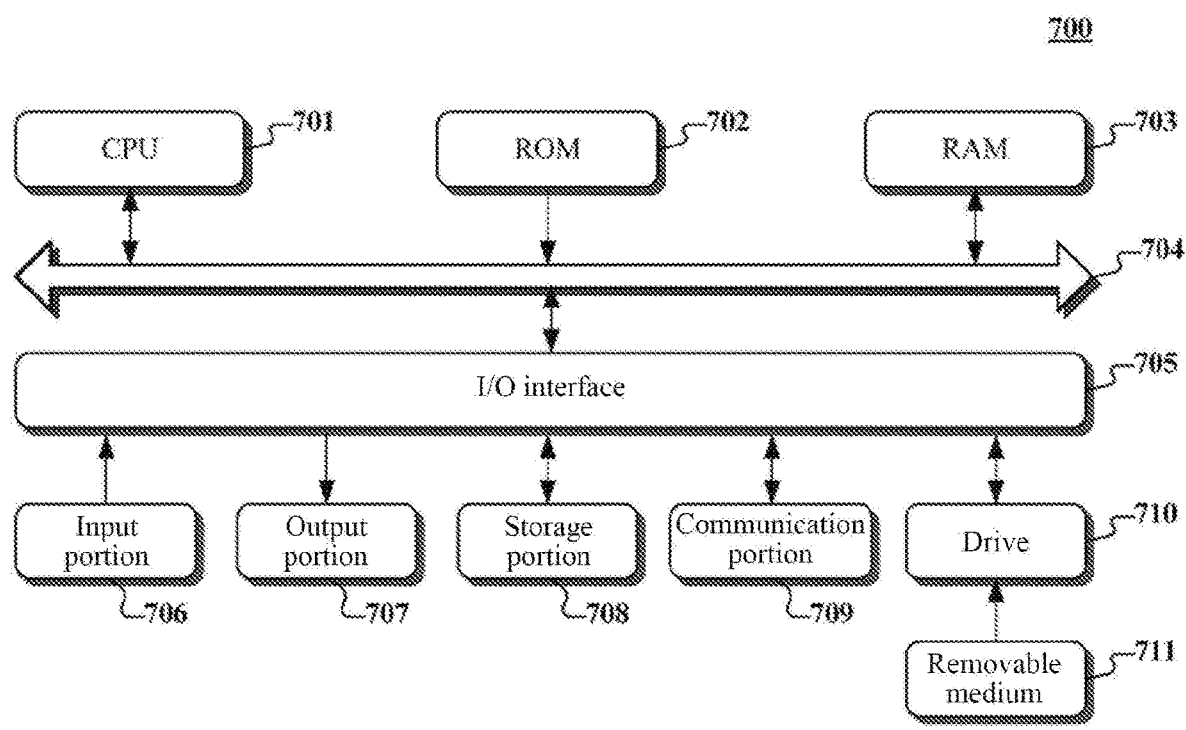
FIG. 7 is a schematic structural diagram of a computer system adapted to implement an electronic device according to the embodiments of the present disclosure.

Referring to FIG. 7, FIG. 7 is a schematic structural diagram of a computer system 700 adapted to implement an electronic device (e.g., the servers 103 and 105 shown in FIG. 1) of the embodiments of the present disclosure. The electronic device shown in FIG. 7 is merely an example, and should not bring any limitations to the functions and the scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card such as a LAN card and a modem. The communication portion 709 performs communication processes via a network such as the Internet. A driver 710 is also connected to the I/O interface 705 as required. A removable medium 711 such as a magnetic disk, an optical disk, a magneto-optical disk, and a semiconductor memory may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 709, and/or may be installed from the removable medium 711. The computer program, when executed by the central processing unit (CPU) 701, implements the above mentioned functionalities defined in the system of some embodiments of the present disclosure.

It should be noted that the computer readable medium in some embodiments of the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In some embodiments of the present disclosure, the computer readable storage medium may be any physical medium containing or storing programs, which may be used by a command execution system, apparatus or element or incorporated thereto. In some embodiments of the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, a command execution system, apparatus or element. The program codes contained on the computer readable medium may be transmitted with any suitable medium including, but not limited to, wireless, wired, optical cable, RF medium, or any suitable combination of the above.

A computer program code for executing the operations according to some embodiments of the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor. For example, the processor may be described as: a processor comprising a receiving unit, a setting unit and a publishing unit. Alternatively, the processor may be described as: a processor comprising a receiving unit and a processing unit. The names of these units do not in some cases constitute a limitation to such units themselves. For example, the setting unit may also be described as "a unit for applying a preset video interactive template to a video playing application."

In another aspect, the present disclosure further provides a computer readable medium. The computer readable medium may be the computer readable medium included in the electronic device described in the above embodiments, or a stand-alone computer readable medium not assembled into the electronic device. The computer readable medium stores one or more programs. The one or more programs, when executed by the electronic device, cause the electronic device to: receive a request for publishing a video playing application, wherein the request for publishing may include configuration information of the video playing application; apply a preset video interactive template to the video playing application, wherein the video interactive template may include a processing logic relating to a video; and publish, based on the configuration information, the video playing application applied with the video interactive template. Alternatively, the one or more programs, when executed by the electronic device, cause the electronic device to: receive a request related to a video resource provided by a target video playing application; and process the request using a video interactive template applied to the target video playing application.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the disclosure, for example, technical solutions formed by replacing the features as disclosed in the present disclosure with (but not limited to) technical features with similar functions.

What is claimed is:

1. A method for publishing information, comprising:
receiving a request for publishing a video playing application, the request for publishing including configuration information of the video playing application;
identifying a user corresponding to the request for publishing the video playing application;
identifying a preset video interactive template corresponding to the user, wherein the preset video interactive template comprises a brightness level specific for the user;
applying the preset video interactive template to the video playing application, the video interactive template including a processing logic relating to a video, the processing logic including a first processing logic, and the first processing logic including a logic for processing a request for playing a video and adjusting a brightness to the brightness level specific for the user, wherein the preset video interactive template is pre-stored in a database, and the preset video interactive template that includes adjusting the brightness is applied to the video playing application without input from a developer of the video; and
publishing, based on the configuration information, the video playing application applied with the video interactive template,
wherein the method is performed by at least one hardware processor.

2. The method according to claim 1, wherein the first processing logic further includes a logic for processing at least one request for pausing playing, continuing playing, playing a previous video, playing a next video, stopping playing, adjusting a play progress, or adjusting a volume.

3. The method according to claim 2, wherein the processing logic further includes a second processing logic, and the second processing logic includes a logic for processing at least one index request for indexing a specified video, indexing hot videos, or indexing new videos.

4. The method according to claim 1, wherein the configuration information includes application information and video resource information, the application information includes an application name, an application identifier, and at least one of an application type name, a version number, a cover image, developer information, functional description information, or usage instructions, and the video resource information includes address information of a video resource and at least one of an update frequency, an update time, or a resource type name.

5. The method according to claim 4, wherein the publishing, based on the configuration information, the video playing application applied with the video interactive template comprises:
publishing the video playing application applied with the video interactive template to a preset server, to cause the server to push the video playing application to a client connected to the server, thereby displaying the application information of the video playing application on the client.

6. The method according to claim 4, further comprising:
storing correspondingly the video resource information and the application identifier.

7. A method for processing information, comprising:
receiving a request related to a video resource provided by a target video playing application, the target video playing application referring to the video playing application published using the method according to claim 1, the video playing application being applied with a preset video interactive template, and the video interactive template including a processing logic relating to a video; and
processing the request using the video interactive template.

8. An apparatus for processing information, comprising:
at least one processor; and
a memory storing instructions, the instructions when executed by the at least one processor, causing the at least one processor to perform operations, the operations comprising:
receiving a request related to a video resource provided by a target video playing application, the target video playing application referring to the video playing application published using the method according to claim 1, the video playing application being applied with a preset video interactive template, and the video interactive template including a processing logic relating to a video; and processing the request using the video interactive template.

9. A non-transitory computer-readable storage medium storing a computer program that, when executed by one or more processors, causes the one or more processors to perform operations, the operations comprising:
receiving a request related to a video resource provided by a target video playing application, the target video playing application referring to the video playing application published using the method according to claim 1, the video playing application being applied with a preset video interactive template, and the video interactive template including a processing logic relating to a video; and
processing the request using the video interactive template.

10. The method according to claim 1, wherein receiving the request for publishing the video playing application comprises receiving a voice command from the user.

11. The method according to claim 10, wherein the voice command includes the request for publishing the video playing application, and wherein the method further comprises automatically initiating adjusting the brightness to the brightness level specific for the user.

12. An apparatus for publishing information, comprising:
at least one processor; and
a memory storing instructions, the instructions when executed by the at least one processor, causing the at least one processor to perform operations, the operations comprising:
receiving a request for publishing a video playing application, the request for publishing including configuration information of the video playing application;
identifying a user corresponding to the request for publishing the video playing application;
identifying a preset video interactive template corresponding to the user, wherein the preset video interactive template comprises a brightness level specific for the user;
applying the preset video interactive template to the video playing application, the video interactive template including a processing logic relating to a video, the processing logic including a first processing logic, and the first processing logic including a logic for processing a request for playing a video and adjusting a brightness to the brightness level specific for the user, wherein the preset video interactive template is prestored in a database, and the preset video interactive template that includes adjusting the brightness is applied to the video playing application without input from a developer of the video; and
publishing, based on the configuration information, the video playing application applied with the video interactive template.

13. The apparatus according to claim 12, wherein the first processing logic further includes a logic for processing at least one request for pausing playing, continuing playing, playing a previous video, playing a next video, stopping playing, adjusting a play progress, or adjusting a volume.

14. The apparatus according to claim 13, wherein the processing logic further includes a second processing logic, and the second processing logic includes a logic for processing at least one index request for indexing a specified video, indexing hot videos, or indexing new videos.

15. The apparatus according to claim 12, wherein the configuration information includes application information and video resource information, the application information includes an application name, an application identifier, and at least one of an application type name, a version number, a cover image, developer information, functional description information, or usage instructions, and the video resource information includes address information of a video resource and at least one of an update frequency, an update time, or a resource type name.

16. The apparatus according to claim 15, wherein the publishing, based on the configuration information, the video playing application applied with the video interactive template comprises:
publishing the video playing application applied with the video interactive template to a preset server, to cause the server to push the video playing application to a client connected to the server, thereby displaying the application information of the video playing application on the client.

17. The apparatus according to claim 15, further comprising:
storing correspondingly the video resource information and the application identifier.

18. A non-transitory computer-readable storage medium storing a computer program that, when executed by one or more processors, causes the one or more processors to perform operations, the operations comprising:
receiving a request for publishing a video playing application, the request for publishing including configuration information of the video playing application;
identifying a user corresponding to the request for publishing the video playing application;
identifying a preset video interactive template corresponding to the user, wherein the preset video interactive template comprises a brightness level specific for the user;
applying the preset video interactive template to the video playing application, the video interactive template including a processing logic relating to a video, the processing logic including a first processing logic, and the first processing logic including a logic for processing a request for playing a video and adjusting a brightness to the brightness level specific for the user, wherein the preset video interactive template is prestored in a database, and the preset video interactive template that includes adjusting the brightness is applied to the video playing application without input from a developer of the video; and
publishing, based on the configuration information, the video playing application applied with the video interactive template.

* * * * *

UNITED STATES PATENT AND TRADEMARK OFFICE
CERTIFICATE OF CORRECTION

PATENT NO. : 11,095,957 B2  
APPLICATION NO. : 16/355184  
DATED : August 17, 2021  
INVENTOR(S) : Huan Tang Page 1 of 1

It is certified that error appears in the above-identified patent and that said Letters Patent is hereby corrected as shown below:

On the Title Page

Item (73), Lines 1-2, under Assignee, delete "Baidu Online Network Technology (Beijing) Co., Ltd., Beijing (CN)" and insert --Baidu Online Network Technology (Beijing) Co., Ltd., Beijing (CN); Shanghai Xiaodu Technology Co., Ltd.--.

Signed and Sealed this  
Twentieth Day of June, 2023

Katherine Kelly Vidal  
*Director of the United States Patent and Trademark Office*